(12) United States Patent
Marsala et al.

(10) Patent No.: US 8,352,971 B2
(45) Date of Patent: *Jan. 8, 2013

(54) CONTAINED COMMAND INVOCATION FRAMEWORK

(75) Inventors: Paul Marsala, Bohemia, NY (US);
Edwin Babadaglian, Farmingville, NY (US)

(73) Assignee: Composite Ideas, LLC, Ronkonkoma, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,114

(22) Filed: Jul. 26, 2011

(65) Prior Publication Data

US 2012/0023192 A1    Jan. 26, 2012

Related U.S. Application Data

(63) Continuation of application No. 11/829,182, filed on Jul. 27, 2007, now Pat. No. 8,020,177.

(51) Int. Cl.
*G06F 13/00* (2006.01)
(52) U.S. Cl. ...................................... 719/330
(58) Field of Classification Search .................. 719/330
See application file for complete search history.

(56) References Cited

U.S. PATENT DOCUMENTS

| | | | |
|---|---|---|---|
| 5,845,090 A | 12/1998 | Collins, III et al. | |
| 6,134,580 A | 10/2000 | Tahara et al. | |
| 6,230,004 B1 | 5/2001 | Hall et al. | |
| 6,230,160 B1 | 5/2001 | Chan et al. | |
| 6,286,041 B1 | 9/2001 | Collins, III et al. | |
| 6,334,146 B1 | 12/2001 | Parasnis et al. | |
| 6,385,661 B1 | 5/2002 | Guthrie et al. | |
| 6,389,452 B1 | 5/2002 | Glass | |
| 6,415,315 B1 | 7/2002 | Glass | |
| 6,442,586 B1 | 8/2002 | Glass | |
| 6,513,157 B1 | 1/2003 | Glass | |
| 6,519,653 B1 | 2/2003 | Glass | |
| 6,535,928 B1 | 3/2003 | Glass | |
| 6,549,955 B2 | 4/2003 | Guthrie et al. | |
| 6,622,175 B1 | 9/2003 | Piller | |
| 6,629,128 B1 | 9/2003 | Glass | |

(Continued)

FOREIGN PATENT DOCUMENTS

WO    03019442 A2    3/2003

OTHER PUBLICATIONS

Artikis, A. et al.. "Agent Communication Transfer Protocol", Proceedings of the Fourth International Conference on Autonomous Agents, Jun. 2000, pp. 491-498.

(Continued)

*Primary Examiner* — Andy Ho
(74) *Attorney, Agent, or Firm* — St. Onge Steward Johnston & Reens LLC (57) ABSTRACT

An object-oriented middleware framework for use in a network having a plurality of hosts including a first host having an associated first memory and first processor; and a second host having an associated second memory and second processor. The object-oriented middleware framework includes an Originator Command Container instantiating a Command by executing computer programming code stored in the first memory using the first processor. The framework also includes an Invocator Command Container, remote from the Originator Command Container and its associated first host where the instantiated Command is invoked, locally by executing computer programming code stored in the second memory using the second processor.

21 Claims, 4 Drawing Sheets

U.S. PATENT DOCUMENTS

| | | | |
|---|---|---|---|
| 6,678,743 | B1 | 1/2004 | Glass et al. |
| 6,810,522 | B2 | 10/2004 | Cook et al. |
| 6,813,629 | B1 | 11/2004 | Kocherlakota et al. |
| 7,797,724 | B2 * | 9/2010 | Calvin .............................. 726/1 |
| 8,020,173 | B2 * | 9/2011 | Cook et al. .................... 719/316 |
| 2003/0014552 | A1 | 1/2003 | Vaitheeswaran et al. |
| 2003/0115379 | A1 | 6/2003 | Burton et al. |
| 2004/0158843 | A1 | 8/2004 | Cloccarelli |
| 2005/0055698 | A1 | 3/2005 | Sasaki et al. |
| 2005/0091664 | A1 | 4/2005 | Cook et al. |
| 2005/0132354 | A1 | 6/2005 | Edwards et al. |
| 2005/0193388 | A1 | 9/2005 | Hayes, Jr. |
| 2006/0036941 | A1 | 2/2006 | Neil |
| 2007/0033597 | A1 | 2/2007 | Mukundan et al. |
| 2008/0295110 | A1 | 11/2008 | Muscarella et al. |

OTHER PUBLICATIONS

Sommers, B., "Agents: not just for Bond anymore", JavaWorld, Apr. 1997.

IBM—"Aglets" Mar. 14, 2002.

MSI Research Institute—"Aglets: Enabling the Virtual Enterprise" ("undated" admitted prior art).

Xu et al, "Building Distributed Application With Aglet" ("undated" admitted prior art).

Wheeler, T., "Developing Peer Applications with Voyager", Recursion Software, Jan. 1, 2003.

Croft, D.W., "Intelligent Software Agents: Definitions and Applications", Oct. 3, 1997.

International Preliminary Report on Patentability and Written Opinion of the International Searching Authority; PCT/US2008/068700; Feb. 2, 2010; 5 pages.

SUN MICROSYSTEMS—"Jini Architectural Overview", Apr. 1, 1999.

Samaras, G. et al., "Mobile Agent Research at UOI" ("undated" admitted prior art).

Emmerich, W. et al., "Implementing Incremental Code Migration with XML"; Proceedings of the 22nd International Conference on Software Engineering, Jun. 2000, pp. 397-406.

Hough, R., "Persistent Reliable JMS Messaging Integrated Into Voyager's Distributed Application Platform", Recursion Software, Jan. 1, 2003.

Wheeler, T., "Reducing Development Effort Using the Voyager ORB", Recursion Software, Jan. 1, 2002.

Wong, J. at al., "SMART mobile agent facility" NH Elsevier, Jan. 1, 2001.

Venners, B.,"The Architecture of Aglets"—Part I, JavaWorld, Apr. 1, 1997.

Venners, B., "The Architecture of Aglets"—Part 2, JavaWorld, May 1, 1997.

Recursion Software, "Voyager Edge: Inteligent Distributed Computing Platform" 2006.

Nork, M. et al., "Voyager: An Overview", Recursion Software, Aug. 1, 2003.

Hung, E. et al., "Web Site Analysis and Customization: Web Customization Using Behavior-Based Remote Executing Agents", Proceedings of the May 13, 2004, pp. 694-703.

* cited by examiner

CONTAINED COMMAND INVOCATION FRAMEWORK

CROSS-REFERENCE TO RELATED APPLICATIONS

The present application is a continuation of U.S. patent application Ser. No. 11/829,182, filed on Jul. 27, 2007, now U.S. Pat. No. 8,020,177 issued Sep. 13, 2011, the content of which is incorporated herein by reference.

FIELD OF THE INVENTION

The present invention is directed to an object oriented middleware framework for use in a distributed computing system such as an enterprise computing system.

BACKGROUND OF THE INVENTION

In a distributed computing system components constituting an application are physically located on different computers connected by a network. A middleware framework or architecture is used to establish a communication, access a remote application and exchange data without having knowledge of its low level technical operating details. Thus, the middleware framework acts as an intermediary to enable access to a remote application without having knowledge of the network protocol.

A procedure is a section of code that can be called from other parts of the same, albeit a larger, program. The concept of a remote procedure call (RPC) occurs when a procedure is invoked by another program, often running elsewhere on a network. Traditional RPC denotes a coupled form of distributed computing. In other words, procedure calls are innately synchronous, based on a request-reply protocol wherein the calling program blocks or waits until the procedure is complete. This applies to both local and remote calls, but what distinguishes one case from the other is the issue of availability. Given an operational network the "presence" of the procedure is assumed by the caller at the time of the call, which is generally safe if the procedure is local. However, the outcome of a call made to an unavailable remote procedure is circumstantial. A performance problem will only yield a slow response which delays the caller; however, a system or network failure will produce an error condition resulting in the loss of the call. Failed procedure calls need to be resubmitted as they are not subject to transactional control.

One type of middleware is message-oriented middleware (MOM) that enables communication between software applications much like e-mail systems do for users. Messages may be passed in either a point-to-point or a publish-subscribe fashion. In the former case, a message produced by an application is consumed by exactly one other application, while for the latter, a message may be consumed by none, one or multiple applications. It is somewhat common, albeit dependent upon the implementation of a specific MOM provider (e.g., WebSphere MQ or Active MQ) that messaging occurs in a store-and-forward manner based on the premise of message queuing. The queuing is a device that holds and distributes messages. Messages are retained in the queue until one or more recipients have collected them. The queue acts as a physical intermediary, which effectively decouples the sender from the recipient of the message. Message queues help to ensure that messages are not lost, even if the receivers are momentarily unavailable (e.g., due to network disconnection).

Message queuing systems may connect senders and receivers in several ways. In a peer-to-peer topology a single sender is connected to a single receiver via a single queue. Alternatively, in a hub-and-spoke more complex interactions are provided such as one-to-many or many-to-many wherein the message is distributed to all receivers who have previously indicated interest in the topic by registering as subscribers with a common broker. Typically, message queuing systems enable the interconnection of multiple physical queues into one logical queue, with one queue manager on the sender side and another on the receiver side, providing improved decoupling between sender and receiver.

Another type of middleware is referred to as object-oriented middleware (OOM) which is based on object oriented programming (OOP) and manipulation at the distributed network level. The concept of OOP has emerged as an alternative to the conventional modular programming styles based on procedure or function calls. The field of OOP is grounded in the reuse of successful design techniques. A coherent and flexible enterprise system is, by and large, associated with the adoption of design patterns, i.e., a collection of documented approaches to applied object-oriented principles discovered through practice. Distributed objects are supported by an Object Request Broker (ORB) which manages the communication and data exchange with remote objects across a network. Some examples of more commonly employed ORB implementations include CORBA (the Common Object Request Broker Architecture) (universally applicable to multiple platforms and programming languages), Microsoft's Distributed Common Object Model (DCOM) (restricted to Microsoft platforms) and Java's Remote Method Invocation (RMI) (restricted to Java platforms). CORBA, DCOM and RMI employ object servers which conduct the instantiation process for their hosted objects. Invocation occurs in response to requests from client applications typically residing elsewhere on the network. Accordingly, conventional ORBs support instantiation and invocation at the same host.

It is desirable to develop an object oriented middleware framework with substantially greater flexibility in which invocation of a Command occurs locally but remotely from instantiation.

SUMMARY OF THE INVENTION

The present inventive object oriented middleware framework uses Command Containers installed on every host/node that receive and execute a Command transmitted via a request.

One aspect of the present invention is directed to an object-oriented middleware framework for use in a network having a plurality of hosts including a first host having an associated first memory and first processor; and a second host having an associated second memory and second processor. The object-oriented middleware framework includes an Originator Command Container instantiating a Command by executing computer programming code stored in the first memory using the first processor. The framework also includes an Invocator Command Container, remote from the Originator Command Container and its associated first host where the Command is instantiated, locally invoking the instantiated Command by executing computer programming code stored in the second memory using the second processor.

The invention is also directed to a method for employing an object-oriented middleware framework in a network having a plurality of hosts, wherein the method comprises the steps of: (i) providing a first host and storing in a first memory associated with the first host computer programming code executed by a first processor associated with the first host to establish an Originator Command Container; (ii) providing a second host and storing in a second memory associated with the second host computer programming code executed by a second processor associated with the second host to establish an Invocator Command Container; (iii) instantiating a Command generated by the Originator Command Container using the first processor associated with the first host; and (iv) invoking locally the Command via the Invocator Command Container using the second processor associated with the second host remotely from the Originator Command Container and its associated first host where the Command is instantiated.

Another aspect of the invention is directed to an article of manufacture including a computer program storage medium readable by a computer, the medium tangibly embodying one or more computer program encoded with instructions executable by the computer to perform a method for employing an object-oriented middleware framework in a network having a plurality of hosts, wherein the method includes the steps of: (i) providing a first host and storing in a first memory associated with the first host computer programming code executed by a first processor associated with the first host to establish an Originator Command Container; (ii) providing a second host and storing in a second memory associated with the second host computer programming code executed by a second processor associated with the second host to establish an Invocator Command Container; (iii) instantiating a Command generated by the Originator Command Container using the first processor associated with the first host; and (iv) invoking locally the Command via the Invocator Command Container using the second processor associated with the second host remotely from the Originator Command Container and its associated first host where the Command is instantiated.

Yet another aspect of the present invention relates to a computer readable program product establishing an object oriented framework in a network having a plurality of hosts including a first host having an associated first memory and first processor; and a second host having an associated second memory and second processor. The object oriented framework includes an Originator Command Container instantiating a Command by executing computer programming code stored in the first memory using the first processor. In addition, the object oriented framework also includes an Invocator Command Container, remote from the Originator Command Container and its associated first host where the Command is instantiated, locally invoking the instantiated Command by executing computer programming code stored in the second memory using the second processor.

Still a further aspect of the present invention is directed to a method for employing an object-oriented middleware framework in which a Command is invoked locally but remotely from where the Command was instantiated.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

The present inventive object oriented middleware framework incorporates the advantages associated with an asynchronous system, but in support of a different invocation scheme from that of conventional frameworks. Specifically, the present inventive middleware framework employs Command Containers installed on all participating nodes of the network.

Figure 1:
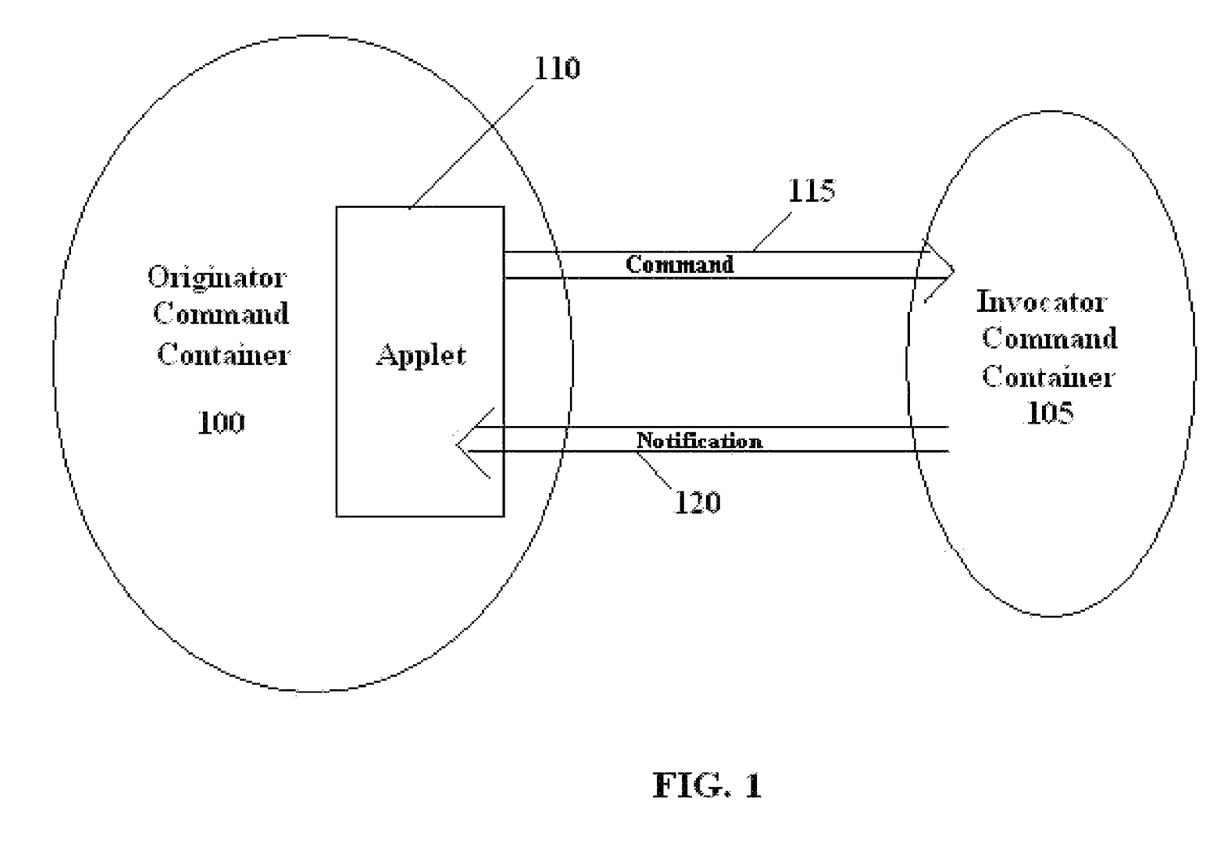
FIG. 1 is a schematic diagram depicting communication between a single Originator Command Container and a single Invocator Command Container in accordance with the present inventive middleware framework.

FIG. 1 depicts an exemplary network of participant hosts employing the present inventive object oriented middleware framework in accordance with the present invention. Specifically, the network comprises two nodes/hosts (e.g., personal computers, desktop computers, laptop computers, servers, handheld computing devices, personal digital assistants (PDA), cellular telephones, mobile computing devices or any other device able to host a processor). Each node/host in the network includes at least one Command Container. Command Containers are software systems that house other software components relating to origination or invocation of Commands, wherein these software components may be added or removed at runtime. Furthermore, Command Containers provide operational support, such as transaction management, persistence, fault-tolerance and logging, for the applications they host while factoring out the non-functional requirements of any given application.

Command Containers in accordance with the present invention are classified into one of two groups, i.e., Originator Command Containers (also referred to as Source Command Containers or Hub Command Containers) and Invocator Command Containers (also referred to as Target Command Containers, Invoker Command Containers or Agent Command Containers). The present inventive middleware framework employs containers that adhere to a hub-and-spoke topology, whereby the Originator Command Container serves as the Hub, while the Invocator Command Containers act as Agents of the Hub. A domain is established including at least one Originator Command Container and one or more Invocator Command Containers. Accordingly, Invocator Command Containers within a domain may be strategically selected within the context of a particular application. Command origination and invocation occur among these participant hosts based on the Command Containers they employ. Command invocation requires an instance of an Invocator Command Container process to be active on a participant host. Likewise, Command origination is achieved through an Originator Command Container instance on a participant host. Participant hosts will more often provide either invocation or origination exclusively, however, co-hosting of both operations on the same host is possible and within the intended scope of the present invention.

Communications between Originator and Invocator Command Containers in accordance with the present inventive middleware framework may be either coupled by the identification of one or more specific host participants or decoupled whereby communication is mutually exclusive of each others presence. Accordingly, activities in the inventive framework may be either synchronous or asynchronous. Invocator Command Containers via their associated participating hosts are named entities that can enter and exit the network, as needed, depending on whether either the Invocator Command Container itself is inactive or its associated participating host is disconnected from the network (but still may remain running). Referential decoupling refers to the fact that the Originator Command Container is permitted to disperse a Command to any or all available Invocator Command Containers in a domain rather than to a predetermined set of identified Invocator Command Containers. Temporal decoupling suggests that an indeterminate amount of time may pass between when a Command was submitted and received, again based on the Invocator Command Container's availability.

The invocation of a task and controlled transmission of data exchange over the domain between Originator and Invocator Command Containers is realized through the use of Commands. A Command 115 is an object or, more particularly, a software artifact that encompasses data/state (variables, parameters) and behavior (method, functions). In particular, a Command 115 is instantiated and configured at the Originator Command Container 100 and invoked locally at the Invocator Command Container 105 remotely from the Originator Command Container 100. Command 115 is an order or request to perform a specific task that may be either transient or persistent. A Command is a parametric object designed for normalized invocation. Commands are built according to application requirements and perform distinct functions from one another. However, invocation of Commands is uniform across all variations and in compliance with the specifications of the Invocator Command Container.

Commands are coarse-grained functions that are created, tested and packaged using conventional programming tools and framework libraries. However, the development lifecycle of a Command in accordance with the present inventive framework occurs within a specific application context. During installation Commands are uploaded and registered into a context, much like that of software applications installed on a computer. The Originator Command Container 100 preferably maintains a registry of Commands and provides appropriate programmatic interfaces to facilitate the installation process.

It is desirable for Originator and Invocator Command Containers to enforce an invocation scheme to ensure that the conditions for invocation of a Command are satisfied. To accomplish this, Invocator Command Containers preferably adhere to an invocation scheme or contract with a set of restrictions, conditions and/or requirements referred to as a Command Pattern to ensure proper invocation of Commands. For instance, the Command pattern may include a particular inheritance structure or provide a particular application programming interface (API) as well as other restrictions, conditions or requirements. Compliance with the invocation scheme employed by the Containers ensures that all Commands, regardless of their functional specifications, scope or relative complexity, may be universally invoked by any Invocator Command Container 105. Commands designed in accordance with the Command Pattern are generally single-purpose with non-specific degrees of granularity. In conventional OOP, invocation occurs on an object's method and often a method's name reflects its underlying purpose. However, the present inventive Command advantageously possess a single well-known yet non-descript method whose purpose is indicated by the class name from which the Command is instantiated. The Command itself represents a foreign body of programming code to that of the Originator Command Container and Invocator Command Container, each of which are separate and distinct pieces of software created completely independent of one another.

Figure 2:
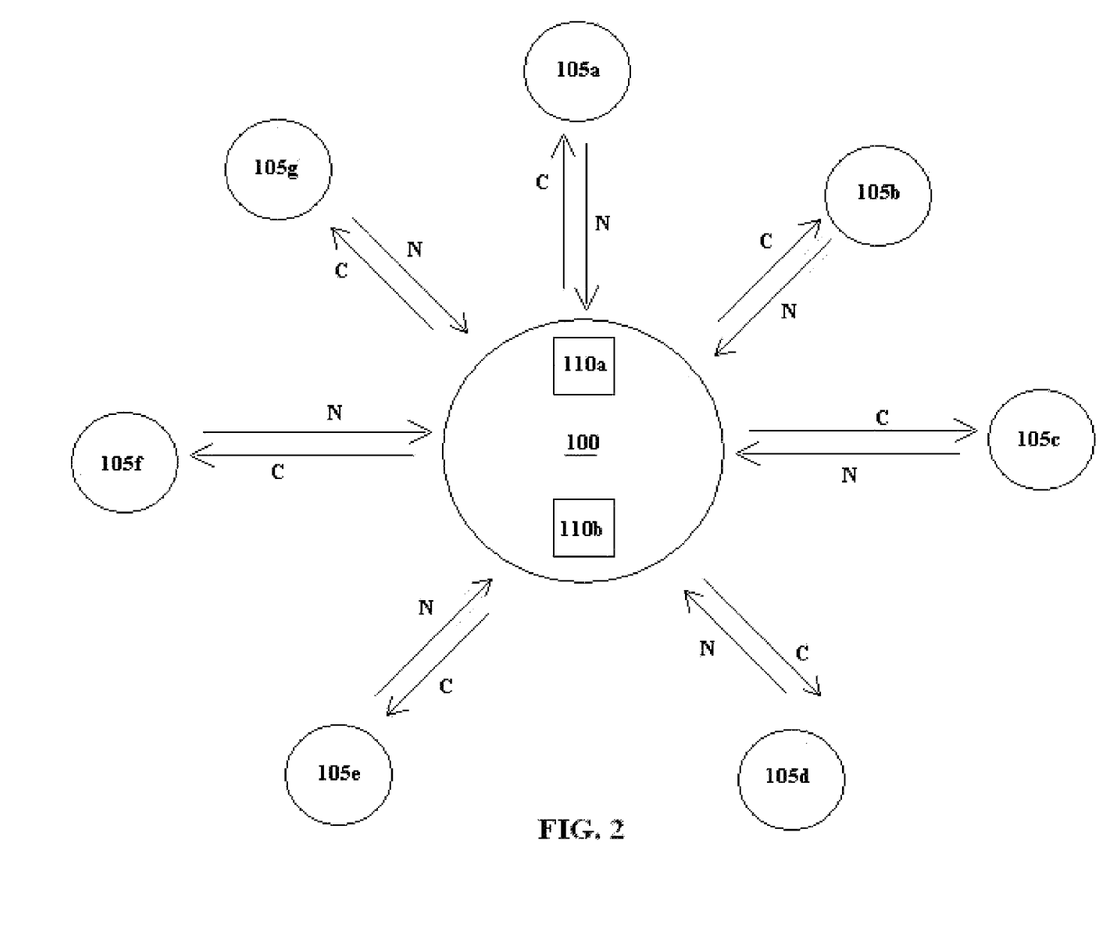
FIG. 2 is an exemplary network including a single Originator Command Container and a plurality of Invocator Command Containers in which Commands are invoked employing the object oriented middleware framework in accordance with the present invention.

Originator Command Container 100 hosts an Applet 110 which is a software component that runs in the context of another program, for example JAVA in a web browser. An Applet usually performs a very narrow function that has no independent use. Unlike a program, an Applet cannot run independently. The Applet runs in a container provided by a host program that supports the Applet programming model. It is not uncommon for an Originator Command Container 100 to host multiple Applets 110 (as shown in FIG. 2), as well as one or more instances per Applet. As a result of the contract establishing the Command Pattern, any Applet instance may interact with any/all Invocator Command Containers 105 as well as execute all Commands created by an Originator Command Container 100 or process those Commands received from an Invocator Command Container 105. The Applet 110 is hosted by its Originator Command Container and is accessible via a user interface.

Referring to FIG. 1, the lifecycle of a Command using the present inventive framework will now be described with respect to a single Originator Command Container 100 and a single Invocator Command Container 105. Originator Command Container 100 represents the origin of an application's distributed lifecycle. Specifically, the Originator Command Container 100 defines the entry point or staging area where Commands undergo origination comprising three discrete phases of deployment: instantiation, configuration and dispersion. Users or administrators interact with the Originator Command Container 100 via a user interface to perform the framework of events that comprise the component's existence. The Invocator Command Container 105 is the sole component charged with invocation of a Command dispersed by the Originator Command Container 100. Like the Originator Command Container, the Invocator Command Container 105 offers the resources of its host device, whether they be storage and/or computational in nature, to the Command being invoked to complete its task. Invocation is local relative to the resources of its host device. Therefore, the significance of delegation of a Command from the Originator Command Container 100 to a particular Invocator Command Container 105 is based on locality (proximity) and resources provided by the host device and required by the Command to be invoked. In addition, the Command outcomes may differ depending on the host on which they are invoked. The result of a Command invocation is influenced by such factors as: (i) its property settings; and (ii) the environment (Invocation Command Container) in which it is invoked. For example, two identical instances of a "ScanDirectory" Command may provide different responses if invoked on different hosts.

During its execution, Originator Command Container 100 via an originating Applet 110 instantiates and configures a Command 115 (including the Command's state and executable code) for use. The instantiated Command 115 represents a delegated order that is dispersed to a designated Invocator Command Container 105 to execute a particular task or function. As part of its lifecycle duties supporting invocation, the Invocator Command Container 105 provides a runtime environment for the Command to operate. Each Command represents a single task, function or service with a programmatically uniform interface or invocation trigger. Command functionality may be property-driven requiring input to be supplied in the field. For example, a Command called "StartProcess" may have a property called "FileName" which is to be supplied. Typically, Commands are built according to use-cases that govern their degree of generality. The present inventive framework imposes no requirements in this regard, only that values be supplied by the Originator Command Container for properties that a Command requires prior to dispersal to the Invocator Command Container. In addition, as part of configuration it is contemplated and within the intended scope of the present invention for several Command instances to be linked together, as desired, to create a composite Command.

Once instantiated and configured, Command 115 is thereafter dispersed by the originating Applet 110 of the Originator Command Container 100 to its intended destination Invocator Command Container 105. Migration or mobility describes the ability of a Command to be relocated from one container to another, such as the ability of a Command to be relocated from either an Originator Command Container or an Invocator Command Container to another Invocator Command Container. Dispersion refers to the process of transmitting Commands 115 from the Originator Command Container 100 to one or more Invocator Command Containers 105 for invocation. The Originator Command Container 100 provides various services and shares infrastructural resources with Invocator Command Containers 105 to facilitate dispersion. Invocator Command Containers 105 are uniquely identifiable to allow single and multi-point dispersion of Commands.

Migration is dependent upon serialization and dynamic (class) loading for transferring the Command state and executable code, respectively. The present inventive object oriented middleware framework employs weak-mobility or migration within the context of a Command since invocation is constrained to a single Invocator instance. It is, however, contemplated and within the intended scope of the present invention to accommodate strong-mobility under the invocation contract. To that end, Commands may be designed to simulate strong-mobility where necessary. A Command's state prior to invocation may be set or altered, as desired, in the present inventive framework and thus can advantageously be invoked multiple times across any number of Command Containers, permitting Commands to "wander" and accumulate state as special-case behavior. Strong mobility may also be approximated at the application level. Migration, as perceived through the framework, is qualified as "sender-initiated" or "pushed" on the part of the Invocator Command Container 105. That is, Command 115 is sent by Originator Command Container 100 to be invoked when received by Invocator Command Container 105. Invocation is always local to the Invocator Command Container 105 rather than the Originator Command Container 100.

As previously noted above, it is the Invocator Command Container 105 where Commands 115 dispersed from the Originator Command Container 100 are invoked. Accordingly, the Invocator Command Container 105 is the sole container charged with Command invocation. Accordingly, invocation of the Command is always local to the resources of its host. The execution or instruction code may be loaded by the Invocator Command Container as either a local or remote resource. That is to say that an Invocator is a manage asset, with declared instruction-code dependencies and policies, that may be deployed as statically or dynamically as deemed appropriate. In either case, facilitating instruction-code administration is within the scope of the present inventive middleware framework.

In particular, the execution or instruction code (representing operations to be performed that satisfy application requirements specific to the problem domain) does not originate with the Invocator Command Container 105. Two avenues of delivery of the execution or instruction code are available. The instruction code may be a part of the uploading or deploying of the Applet. Alternatively, the instruction code may be dynamically downloaded with the Command from the Originator Command Container 105 at the time of invocation. It should be noted that retransmission of the execution or instruction code is not necessary if it is otherwise deployed to or already cached in the Invocator Command Container 105 during a prior Command by the Originator Command Container. The execution code is bundled with the Command itself as part of the request issued by the Originator Command Container 105 and upon receipt by the Invocator Command Container the code is executed. Thus, the execution or instruction code is linked to the Invocator Command Container 105, by way of the Command 115, at runtime and migrates along with the object's state as part of the request to enable proper invocation upon receipt by the Invocator Command Container 105. In a preferred embodiment, the Invocator Command Container 105 is devoid of any execution or instruction code so that migration (code migration during transmission of the Command request by the Originator Command Container 100) amounts to a field upgrade of sorts. Through migration, the Invocator Command Container 105 may therefore be dynamically morphed into a special-purpose application component, but only for the lifetime of an invocation.

Commands may be invoked by the Invocator Command Container 105 either directly or scheduled in the background. That is, invocation of a Command 115 may be immediately upon its receipt by the Invocator Command Container 105 or invocation may be scheduled to occur at a later predetermined point in time. Thus, Commands may be created, as desired, to exhibit varying lifecycle characteristics.

Once the Command has been invoked, the Invocator Command Container 105, in turn, produces and transmits back to the Originator Command Container 100 a Notification 120 that is inherently transient. The term Notification 120 refers to an object that is transmitted by the Invocator Command Container 105 back to the Originator Command Container 100 to be recorded, processed or acted upon by its originating Applet 110. Notification 120 informs the originating Applet instance as to the outcome or progress of a particular dispersed Command, enabling the Applet to proceed or branch its execution based on the received Notification. In addition to programmatically observing the progress or status of the invoked Commands via Notifications, such observations may also be visually observed via a graphical user interface. Accordingly, actions are centrally observable, which is the key for a distributed system.

The Notification 120 is similar in purpose to a Command 115, in that it delivers the application state to the Originator Command Container 100; however, it does so in the opposite direction and unlike a Command 115 carries no behavior or logic. Therefore, a Notification 120, in contrast with a Command 115, is not subject to invocation when received by the Originator Command Container 100. Commands and Notifications are also similar from a functional point of view in that they are both designed according to application requirements, e.g., Applets are designed to consume Notifications returned by the Commands they issue. Since Notifications are not invoked, a framework-level contract (similar to that associated with invocation for Commands) is not necessary for their consumption by the Applet. Also, a Command issues Notifications but enlists the services of the Invocator Command Container to perform the transmission.

Like the Command 115, the Notification 120 is also enclosed by an originating Applet's instance, therefore its use is defined by the originating Applet 110. When the Notification 120 is responding to the Originator Command Container 100, it is actually responding to its originating Applet's 110 instance that is active in the Originator Command Container 100. The Notification 120 transmitted by the Invocator Command Container 105 is processed by the active originating Applet 110 when received by the Originator Command Container 100. Like the Originator Command Container 100, the Invocator Command Container 105 provides its invoked objects access to applications of the supporting network messaging system via a standard application programming interface (API).

In a preferred embodiment, the Notification object 120 is characterized as an Exception, Response or Event. All Commands are preferably designed to generate an Exception indicating the detection of an error condition. Some Commands may be more prone to generating Exceptions than others depending on such factors as the resources they access.

The other two enumerated Notifications, i.e., Response and Event, are a matter of Command design. On the one hand, a Response takes the form of an outcome, answer or result to the particular Command being invoked by the Invocator Command Container. On the other hand, Events typically take the form of indicators representing the status, progress or completion of the Command being invoked by the Invocator Command Container. An Event may be further distinguished as either framework or application Events. For example, a Command may be established called "SearchDirectory" with a property called "fileName" and a value of "readme.txt". When an Applet running in the Originator Command Container sends this Command to an Invocator Command Container, an Event is expected by the Applet to indicate either "FileFound" or "FileNotFound", which are examples of application-level events. Framework-level events, in the same context, would be "CommandReceived" and "CommandInvoked" which occur at the Invocator Command Container but are relevant and of interest to the Originator Command Container in order to verify that the framework is functioning properly. Due to the decoupling of the Originator Command Container 100 from the Invocator Command Container 105, the Invocator Command Container 105 notifies the Originator Command Container 100 as to the final disposition or completion of the invocation by sending a return message or Event 120. Instead of a single notification at the final disposition or completion, multiple Events may be sent from the Invocator Command Container 105 to the Originator Command Container 100 to report on the progress or status of invocation in stages or phases. This is particularly useful when the Event 120 is generated within the context of a running Command 115 and sent back to the originating Applet 110 associated with the Originator Command Container 100 for processing.

FIG. 2 is an exemplary network comprising a single Originator Command Container 100 in communication with seven Invocator Command Containers 105a, 105b, 105c, 105d, 105e, 105f, 105g. It is contemplated and within the intended scope of the present invention that the network may be modified, as desired, to include more than one Originator Command Container 100 as well as any number of one or more Invocator Command Containers 105. An Originator Command Container and an Invocator Command Container may be co-hosted on the same networked system. In addition, any one or more Invocator Command Containers 105 may be active at any point in time to receive and execute instructions from the Originator Command Container 100. In the example shown in FIG. 2, Originator Command Container 100 hosts two Applets 110a, 110b, however, as mentioned above Originator Command Container 100 may host any number of one or more Applets, as desired. Any Applet instance may interact with any/all Invocator Command Containers 105a, 105b, 105c, 105d, 105e, 105f, 105g.

The present inventive object oriented middleware framework is particularly well suited for bundling a portion of its business logic as an object to be locally invoked in remote Command Containers. In other words, the business object is instantiated in one Command Container (Originator Command Container), then migrates to a different Command Container (Invocator Command Container) prior to invocation. In the context of delegation, the Originator Command Container serves as a manager while the Applet is analogous to a project plan and the Command relates to a specific business task to be performed.

A non-exhaustive list of a few illustrative examples of common types of business logic for use with the present inventive object oriented middleware framework are presented in the table below.

| Command Name | Notification (Exception (EX); Event (E); Response(R)) | Description |
| --- | --- | --- |
| ScanDirectory | EX; R | retrieves the contents of the specified directory |
| WatchDirectory | EX; E; R | retrieves the contents of the specified directory and generates Events indicating the file system changes |
| CalculateChecksum | EX; R | calculates a checksum for the specified file |
| CopyFile | EX; E | copies the contents of the specified source file to the target file |
| DisposeFile | EX; E | disposes (deletes, recycles, retires, etc.) the specified file |
| PushFile | EX; E | transmits the specified file by reading its contents from a memory and writing to a socket |
| PullFile | EX; E | receives the specified file by reading its contents from a socket and writing to a memory |
| ListProcesses | EX; R | retrieves a list of processes running on the current host |
| LaunchApplication | EX; E | launches the specified application |
| ShutdownHost | EX; E | shuts down the current host |
| CaptureScreen | EX; R | generates a snapshot image of the host's desktop |
| MoveMouse | EX; E | moves the mouse cursor on the desktop |
| PressMouse | EX; E | engages the specified mouse button |
| ReleaseMouse | EX; E | disengages the specified mouse button |
| PressKey | EX; E | engages the specified keyboard key |
| ReleaseKey | EX; E | disengages the specified keyboard key |

By way of illustrative example, the present inventive CCI framework will be shown and described with respect to transferring a file across a network. This file transfer operation is described outside of any particular application context.

Figure 3A:
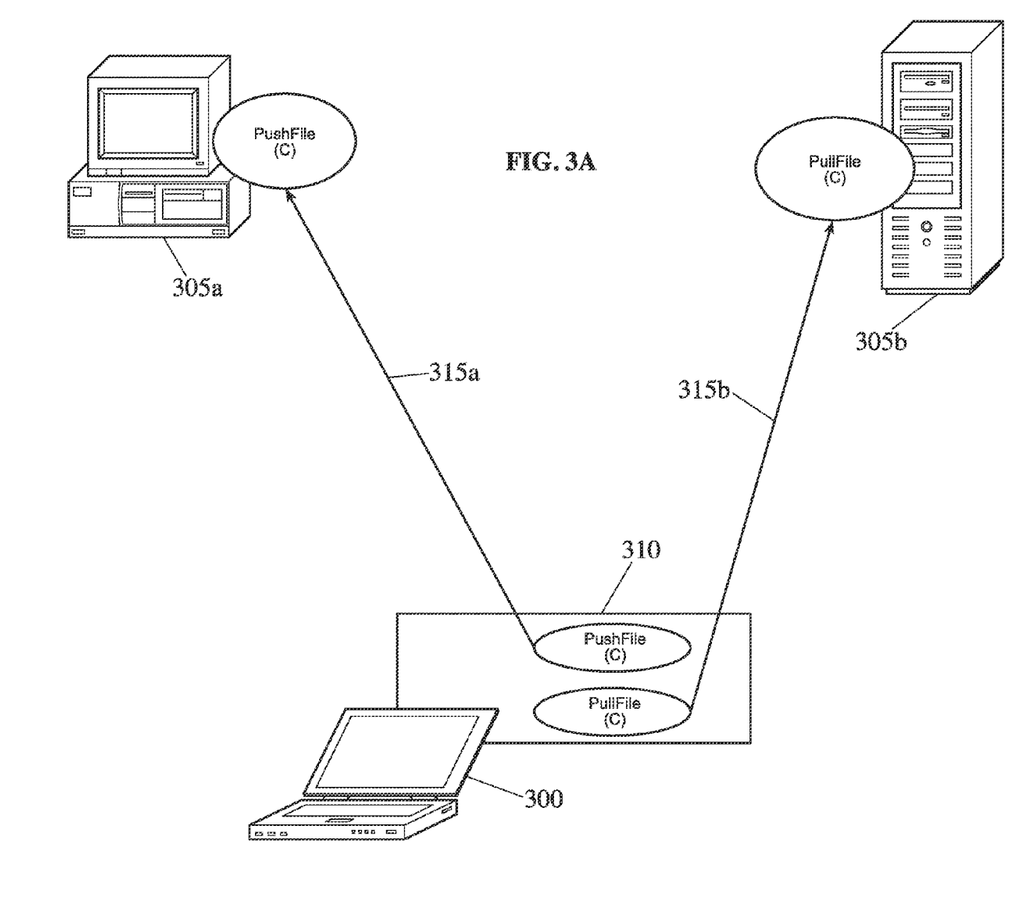
FIG. 3a is an exemplary diagram depicting transmission of file transfer Commands employing the present inventive object oriented middleware framework to transfer a file from a Source Invocator Command Container to a Target Invocator Command Container.
Figure 3B:
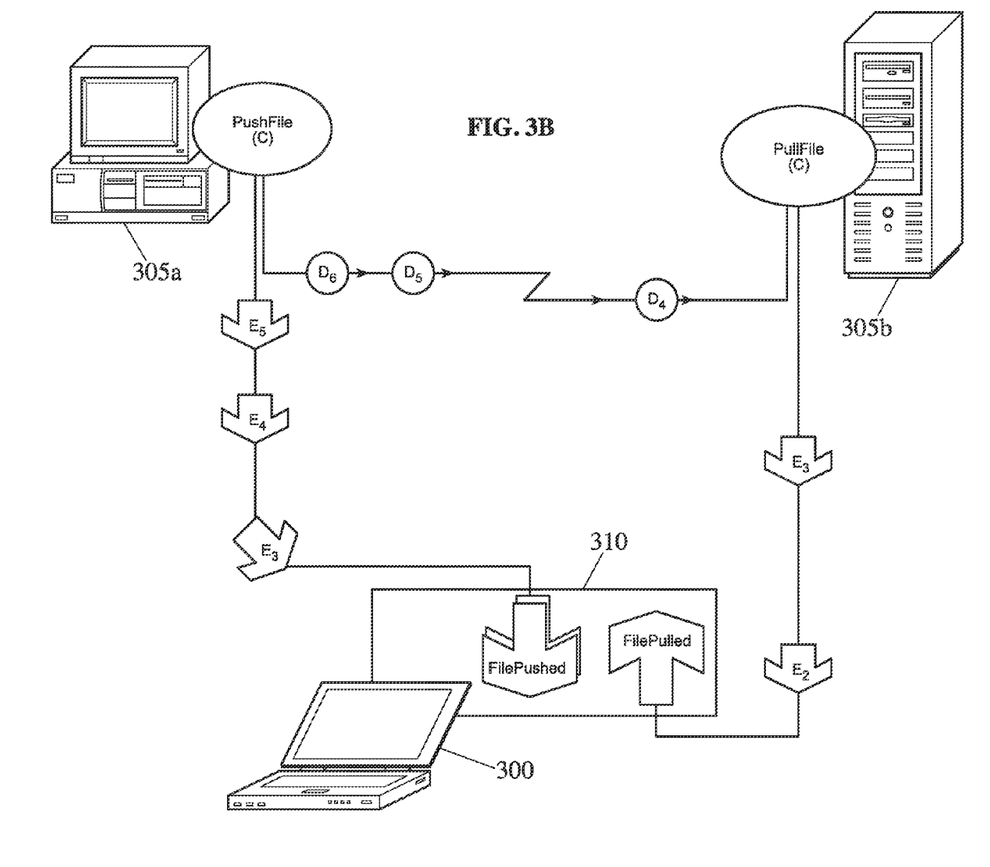
FIG. 3b is an exemplary diagram depicting transmission of file transfer Events employing the present inventive object oriented middleware framework to transfer a file from a Source Invocator Command Container to a Target Invocator Command Container.

Referring to the system shown in FIGS. 3A & 3B, the network comprises an Originator Command Container 300 and two Invocator Command Containers 305a, 305b. The Originator and Invocator Command Containers each run on separate networked host devices such as desktop computers, laptop computers or servers. Each Command Container is provided access to the local files systems of their respective host device; shared directories and file servers are not required. This example will depict the transfer of a file residing on the host device of Source Invocator Command Container 305a to the host device of Target Invocator Command Container 305b. Knowledge of the files residing on the Invocator Command Container's host device may be ascertained by various means including another Contained Command Invocation application. Prior to invocation, the file that is the subject of transfer exists on the host device associated with Invocator Command Container 305a, but may not exist on the host device associated with Invocator Command Container 305b. The Commands are created and the Applet installed on the host device associated with the Originator Command Container 300.

The present inventive middleware framework is predicated on the notion of a Command. In the present example, file transfers are conducted by software components at both ends of the transfer, i.e., the sending and receiving sides. Thus, two Commands are employed, hereinafter referred to as "PushFile" and "PullFile", which interact in tandem to achieve the desired objective of transferring a file across a network.

Software routines required to perform the file transfer reside entirely in the two Commands themselves and, prior to invocation, migrates to, rather than being originally provided in, the Invocator Command Containers. "PushFile" and "PullFile" require invocation at Invocator Command Containers 305a, 305b, respectively, since the file systems of interest are located on those host devices. Each Command's lifecycle begins at Originator Command Container 300 as part of the function of an originating Applet 310. A new Applet instance is created, much like a new document created by word processing software. The "PushFile" and "PullFile" Commands are next configured for the task at hand. Commands typically possess properties that can be set to govern their function. Both "Push File" and "PullFile" Commands have a property called fileName which refers to the file they are configured to act upon when invoked, albeit in their respective manner. In this example, the filename "C:\TransferMe.txt" sets forth the file name properties associated with both Commands. The final aspect of configuration processing requires the identification of the Source and Target Invocator Command Containers that will receive and invoke these Commands, illustrating the practice of delegation. Invocator Command Containers are selected by name and assigned a role as defined by the Applet 310, either 'source' or 'target', in the transfer.

FIG. 3a depicts the sending of Commands by the Originator Command Container 300 to the respective Invocator Command Containers 305a, 305b. Specifically, the Applet 310 associated with Originator Command Container 300 generates and sends "PushFile" Command 315a to the Source Invocator Command Container 305a, while "PullFile" Command 315b is sent to the Target Invocator Command Container 305b. The Commands are executed upon being received by their respective Invocator Command Container.

The "PushFile" Command 315a is executed upon being received by the Source Invocator Command Container 305a whereby the file is located, its contents are read (in sections wherein each section represents a predetermined number of bytes) from its host device's source disk and then written to a buffer. In tandem, "PullFile" Command 315b upon being received by the Target Invocator Command Container 305b is executed causing the stored sections of the file to be read from the same buffer, and then written/overwritten (depending on whether the file already exists) on the host device's target disk associated with the Target Invocator Command Container 305b.

FIG. 3b shows the transmission of Notifications (e.g., Events) from the Invocator Command Containers 305a, 305b to the Originator Command Container 300 at a particular instance of time. In the instance of time shown, the Source Invocator Command Container 305a has already read from its host device's source disk and written to a buffer the first six sections of the file subject to transfer. A corresponding Event is generated by the Source Invocator Command Container 305a upon the completion of the reading and writing of each section. Events E1 and E2 signaling the completion of reading and writing of the first two sections of the file being transferred have already been received by the originating Applet 310 of the Originator Command Container 300, and thus these Events are not depicted in the Figure. Events E3, E4, E5 are in transit having been generated by the Source Invocator Command Container 305a and transmitted to the originating Applet 310. Missing from FIG. 3b is Event E6 which at the point of time depicted in the example being shown either has not yet been generated by the Invocator Command Container 305a or is not yet in transit to the Originator Command Container 300.

Data is pulled by "PullFile" Command 315b in sections from that stored in the same buffer memory and written to the host device's target disk associated with the Target Invocator Command Container 305b. At the particular instance in time represented in FIG. 3b, the first two data sections D1, D2 of the file being transferred have already been processed by the "PullFile" Command (and thus are not shown), whereas the fourth, fifth and sixth sections of data (D4, D5, D6) from the file being transferred from the Source Invocator Command Container 305a to the Target Invocator Command Container 305b are depicted as being in transit.

Lastly, the first three data sections D1, D2, D3 of the file being transferred have already been received and processed by the Target Invocator Command Container 305b and their corresponding Events E1, E2, E3 have been generated. Only Event E1 has been received by the originating Applet 310 at the point in time shown in FIG. 3b and thus is not depicted in FIG. 3b. Events E2 and E3 have been generated by the Target Invocator Command Container 305b and are in transit to, but have not yet been received by, the originating Applet 310. These Events indicate the progress of each Command's portion or section of data being transferred thereby revealing that the Commands are operating properly and independently to realize the specified task or function. This example, however, may be modified so that instead of having a plurality of Events associated with the completion of processing with respect to each section of a file subject to transfer comprising multiple sections only a single Event would be transmitted by the Invocator Command Containers 305a, 305b upon completion of processing.

The principles and features illustrated in the example above may be employed with other applications and Commands. It should be noted that any number of one, two or more Commands may be invoked alone or in tandem depending on the task to be performed and the creation of the Commands.

Command Containers in accordance with the present inventive object oriented middleware framework uphold the underlying concepts of enterprise networks of dispersing non-functional requirements away from application logic and consolidating management of computation resources across the enterprise. However, in contrast to previous distributed architectures which commonly model an invocation as a remote operation, whether in the context of a servlet, session bean or a web service, in the present inventive framework invocation a Command is always performed locally by the Invocator Command Container. Only the submission or transmission of the Command (execution or instruction code) itself from the Originator Command Container to the Invocator Command Container with the request occurs over the network. Therefore, in the present inventive distributed architecture a command object's instantiation and invocation occur remotely from one another.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A file transfer framework system, comprising:
an originator creating on a first computer a first command for pushing a file and a second command for pulling the file;
a first invocator invoking the first command locally on a second computer remotely from where the command was created; and
a second invocator invoking the second command locally on a third computer remotely from where the command was created;
wherein the first and second commands are dispersed to the second and third computers, respectively;
invocation is carried out local to the second and third computers;
the first and second commands have programmatically generic invocation triggers to the second and third computers, respectively; and
the file is transferred from the second computer to the third computer.

2. The system of claim 1 wherein the first command pushes the file to a buffer and the second command pulls the file from the buffer.

3. The system of claim 2 wherein the buffer is a socket.

4. The system of claim 1 wherein before being dispersed the first and second commands are configured on the first computer at least by providing them with information related to the file.

5. An object-oriented middleware framework system, comprising:
a first computer;
a first command container on the first computer, the first command container creating a command and configuring the command on the first computer;
wherein the command comprises functions for making a computer perform an action;
the command is dispersed to a second command container on a second computer;
the command is invoked and carried out on the second computer remotely from where the command was created;
the first command container receives a notification from the command after the command's invocation; and
the command has a programmatically generic invocation trigger to the second computer.

6. The system of claim 5 wherein invocation of the command on the second computer is decoupled from or asynchronous to the first computer.

7. The system of claim 5 wherein the command comprises an application of bundled commands.

8. The system of claim 5 wherein the first computer redistributes the command to the second computer, the redistributed command having updated functionality but substantially the same invocation trigger.

9. The system of claim 5 wherein the first command container comprises an originator.

10. The system of claim 5 wherein the second command container comprises an invocator.

11. The system of claim 5 wherein the command relates to file transfer.

12. The system of claim 5 wherein the command relates to file synchronization.

13. The system of claim 5 wherein invocation occurs upon receipt of the dispersed command.

14. The system of claim 5 wherein invocation occurs at a predetermined time after receipt of the dispersed command.

15. The system of claim 5 wherein the notification comprises an exception, a response and/or an event.

16. The system of claim 5 wherein the first and second computers are in electronic communication with each other over the Internet.

17. The system of claim 5 wherein the first and second computers comprise the same computer.

18. The system of claim 5 wherein the second computer comprises a plurality of computers and the first computer disperses the command to the plurality of computers.

19. An object-oriented middleware framework system, comprising:
an originator creating a command on a first computer; and
an invocator invoking the command locally on a second computer but remotely from where the command was created;
wherein the command is dispersed to the second computer for invocation;
the invocation is carried out local to the second computer; and the command has a programmatically generic invocation trigger to the second computer.

20. The system of claim 19 wherein the command relates to file transfer.

21. The system of claim 19 wherein the command relates to file synchronization.

* * * * *